United States Patent
Sasakawa

(10) Patent No.: US 8,019,117 B2
(45) Date of Patent: Sep. 13, 2011

(54) METHOD AND APPARATUS FOR EVALUATING SOLAR RADIATION AMOUNT

(75) Inventor: Tadashi Sasakawa, Tokyo (JP)

(73) Assignee: Pasco Corporation, Tokyo (JP)

( * ) Notice: Subject to any disclaimer, the term of this patent is extended or adjusted under 35 U.S.C. 154(b) by 0 days.

(21) Appl. No.: 12/680,155

(22) PCT Filed: Jun. 9, 2009

(86) PCT No.: PCT/JP2009/002588
§ 371 (c)(1),
(2), (4) Date: Mar. 25, 2010

(87) PCT Pub. No.: WO2010/106582
PCT Pub. Date: Sep. 23, 2010

(65) Prior Publication Data
US 2010/0310116 A1    Dec. 9, 2010

(30) Foreign Application Priority Data
Mar. 18, 2009  (JP) .................................. 2009-066770

(51) Int. Cl.
*G06K 9/00* (2006.01)
(52) U.S. Cl. .......................... 382/100; 382/113; 382/154
(58) Field of Classification Search .................. 382/100, 382/113, 154
See application file for complete search history.

(56) References Cited

FOREIGN PATENT DOCUMENTS

| JP | 11-211560 A | 8/1999 |
|---|---|---|
| JP | 2004-118639 A | 4/2004 |
| JP | 2005-51014 A | 2/2005 |
| JP | 2006-114838 A | 4/2006 |
| JP | 2006-210750 A | 8/2006 |

*Primary Examiner* — Brian Le
(74) *Attorney, Agent, or Firm* — Apex Juris, pllc; Tracy M. Heims

(57) ABSTRACT

Disclosed is a method and apparatus for evaluating a solar radiation amount that can realize higher accuracy by virtue of consideration of terrain conditions.
Static satellite image data 1 and three-dimensional map model 2 are combined, and a mesh 3 based on plane coordinates is set in accordance with a ground resolution of the static satellite image data 1. A shadow area 4 is calculated based on the three-dimensional map model 2 and a solar position specified by photographing chronological data, and whether or not each cell 8 of the mesh 3 belongs to the shadow area 4 is determined. Also, a solar radiation evaluation component 6 of each cell 8 in an area to be evaluated is obtained with reference to a table 7 associating a pixel value 5 of each pixel in the static satellite image data 1 with the solar radiation evaluation component 6 in an area corresponding to each pixel. In addition, when the cell 8 is determined to belong to the shadow area 4, an evaluation component after terrain condition correction calculated by applying a predetermined correction calculation to the solar radiation evaluation component 6 is obtained.

8 Claims, 4 Drawing Sheets

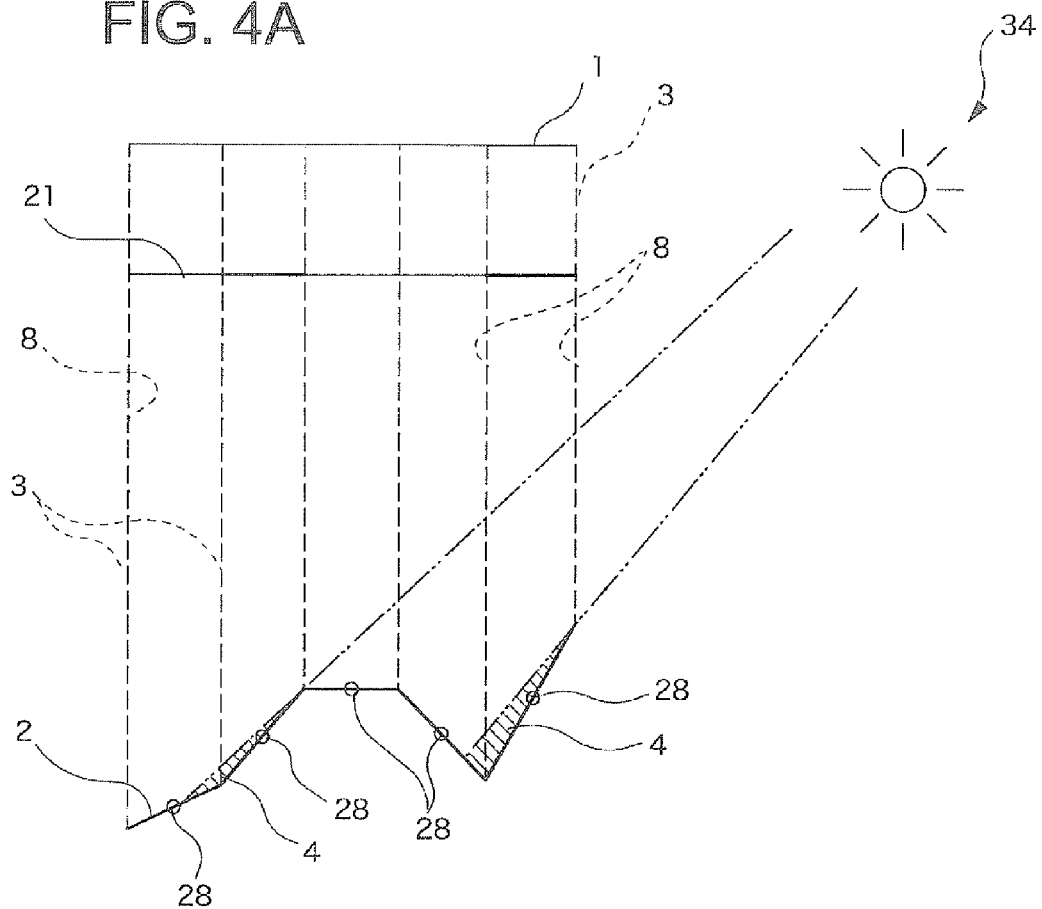

METHOD AND APPARATUS FOR EVALUATING SOLAR RADIATION AMOUNT

TECHNICAL FIELD

This invention relates to a method and apparatus for evaluating a solar radiation amount.

BACKGROUND ART

As a technique of evaluating a solar radiation amount in a predetermined area using a static satellite image, there has been known a technique disclosed in Patent Document 1. In this technique, a value of albedo and a luminance temperature of an area corresponding to each pixel are obtained from a pixel value of a static satellite image. The obtained results are compared with previously obtained past albedo values and so on in sunny weather at the same time period, whereby fine weather or cloudiness is discriminated. The solar radiation amount is calculated by a predetermined calculation formula according to whether it is sunny or cloudy. The calculation formula uses, for example, a solar zenithal angle, a solar constant, distance between the sun and the earth, various transmittances such as a transmittance associated with ozone absorption, a solar absorptance coefficient of a cloud, and the albedo value. The albedo value is obtained by dividing the reflectance of a pixel by the cosine of the solar zenithal angle.

In the method disclosed in Patent Document 2, utilizing the fact that the amount of reflection and the solar radiation amount are directly associated by a regression coefficient based on a statistical relationship, the solar radiation amount is directly estimated based on the amount of reflection, that is, a pixel value of a static weather satellite image.

Patent Document 1: Japanese Patent Application Laid-Open No. 11-211560
Patent Document 2: Japanese Patent Application Laid-Open No. 2004-118639

SUMMARY OF THE INVENTION

As in the above prior arts, when the static satellite image is applied for use in the evaluation of the solar radiation amount, only the pixel value, or only the pixel value and the astronomical and meteorological conditions including the aspects of the sun and the atmosphere have been considered, and terrain conditions have not been considered. Therefore, the evaluation is less accurate, and for example in the analysis of agricultural crop situations and a heat-island phenomenon, the evaluation cannot effectively function.

This invention has been made in order to solve the above prior art problems and it is therefore an object of this invention to provide a method and apparatus for evaluating a solar radiation amount that can improve the accuracy by considering terrain conditions.

In order to achieve the above object, this invention provides a method for evaluating a solar radiation amount. This method comprises obtaining static satellite image data 1 along with photographing chronological data, then combining the static satellite image data 1 with a three-dimensional map model 2, then, in accordance with a ground resolution of the static satellite image data 1, setting a mesh 3 based on plane coordinates to the combination data and, in accordance with the mesh 3, setting a predetermined area in the combination data as an area to be evaluated, thereafter calculating a shadow area 4, generated in the area to be evaluated, based on the three-dimensional map model 2 and a solar position specified by the photographing chronological data and determining whether or not each cell 8 of the mesh 3 belongs to the shadow area 4 in accordance with a predetermined criterion, and with reference to a table 7 associating a pixel value 5 of each pixel in the static satellite image data 1 with a solar radiation amount evaluation component 6 of an area corresponding to each pixel, obtaining the solar radiation amount evaluation component 6 of each cell 8 in the area to be evaluated, and when the relevant cell 8 is determined to belong to the shadow area 4, obtaining, instead of the solar radiation amount evaluation component 6, an evaluation component after terrain condition correction that is calculated by applying a predetermined correction calculation to the solar radiation amount evaluation component 6, whereby the solar radiation amount in the area to be evaluated is evaluated.

This invention can realize the evaluation of the solar radiation amount considering the generation of a shadow due to terrain, and therefore, such an area that is affected by a shadow due to terrain can be evaluated with extremely high accuracy. The generation of a shadow can be grasped by calculating the shadow area 4 from the three-dimensional map model 2 and the solar position, using the three-dimensional map data 21 instead of two-dimensional map data that has been combined to the static satellite image data 1 in the prior art for the purpose of imparting high precision positional information.

Thus, this invention can realize the solar radiation amount evaluation that can realize the accuracy required in the analysis of agricultural crop situations, proper place selection for crops, parameters of precision agriculture, and a heat-island phenomenon.

In the determination of the shadow area 4, in accordance with the ground resolution of the static satellite image data 1, the mesh 3 based on plane coordinates is set to the combination data obtained by combining the static satellite image data 1 with the three-dimensional map model 2, and the determination of the shadow area 4 is performed in units of the cell 8 of the mesh 3, whereby the determination can be performed without unnecessarily reducing the resolution performance between the three-dimensional map data 21 expected to have a relatively high resolution performance and the static satellite image data 1 expected to have only a relatively low resolution performance. In that case, the center of the cell 8 is determined as a determination representative point 28, and whether or not the determination representative point 28 belongs to the shadow area 4 on the three-dimensional map model 2, from which the shadow area 4 is calculated based on the relation with the solar position, can be used as a criterion in the shadow determination in units of the cell 8.

In the reflection for the evaluation of the solar radiation amount when the determination representative point 28 is determined to belong to the shadow area 4, it is only necessary to apply a predetermined correction calculation to the solar radiation amount evaluation component 6 led in the prior art not considering the generation of a shadow. The correction calculation can be suitably performed, for example, considering the loss of a direct solar radiation amount due to a shadow or performing setting in accordance with statistics based on empirical rules.

The consideration of the terrain conditions given to the solar radiation amount evaluation is useful in the generation of a shadow due to terrain and in a sloping terrain. In that case, a method for evaluating a solar radiation amount can be configured to include obtaining the static satellite image data 1 along with the photographing chronological data, next combining the static satellite image data 1 with the three-dimensional map model 2, then, in accordance with a ground resolution of the static satellite image data 1, setting a mesh 3 based on plane coordinates to the combination data and, in accordance with the mesh 3, setting a predetermined area in the combination data as the area to be evaluated, thereafter, based on the three-dimensional map model 2, in accordance with a predetermined criterion, obtaining a representative slope angle and a representative slope direction of each cell 8 of the mesh 3 in the area to be evaluated, calculating, for each cell 8, a slope correction coefficient adopted for use in the conversion from the solar radiation amount evaluation, that is received when each cell 8 is assumed to be a plane (a horizontal plane), vertical to a solar radiation direction, based on a solar position specified by the photographing chronological data, to the solar radiation amount evaluation received when the representative slope angle and the representative slope direction are applied, and obtaining a solar radiation amount evaluation component 6 of each cell 8 in the area to be evaluated with reference to a table 7 associating a pixel value 5 of each pixel in the static satellite image data 1 with the solar radiation amount evaluation component 6 in each area when an area corresponding to each pixel is assumed to be a horizontal plane, and thereafter obtaining an evaluation component after terrain condition correction for each cell 8 calculated by applying correction calculation to the solar radiation amount evaluation component 6 with the correction coefficient, so that the solar radiation amount in the area to be evaluated is evaluated.

In this invention, the solar radiation amount is evaluated considering a slope of the earth's surface in the area to be evaluated subjected to solar radiation, whereby the solar radiation amount in a sloping ground can be evaluated with extremely high accuracy. The slope information can be obtained from the three-dimensional map data 21. For example, as described above, the center of the cell 8 is determined as the determination representative point 28, and the representative slope angle and the representative slope direction of each cell 8 is calculated based on a difference in elevation data of the determination representative point 28 of the peripheral cells 8, whereby it can be judged.

Thus, as in the above case, this invention also can realize the solar radiation amount evaluation that can realize the accuracy required in agricultural crop situations, proper place selection for crops, parameters of precision agriculture, and analysis of a heat-island phenomenon.

In the reflection of the slope information for the solar radiation amount evaluation, a correction coefficient of the solar radiation amount may be calculated from the slope information, and it is only necessary to apply correction calculation to an evaluation value, led in the prior art not considering the slope of the earth's surface, with a correction coefficient. The correction coefficient can be suitably determined, for example, considering Lambert's cosine law.

Further, the slope information of the earth's surface is obtained as described above, whereby the amount of reflected solar radiation of the sunlight from the earth's surface is calculated based on the solar position and the slope information of the earth's surface, and it can be added to the evaluation of the solar radiation amount.

In the two inventions mentioned above, as the solar radiation amount evaluation component 6 led by associating the static satellite image data 1 one-to-one with the pixel value 5, the solar radiation amount is used as it is like the above prior art, or there can be used a cloud's solar radiation transmission coefficient that can be a major factor when the solar radiation amount is grasped. As the evaluation amount for use in the solar radiation amount evaluation, the solar radiation amount can be used as it is, or a suitable index can be used. In that case, when the cloud's solar radiation transmission coefficient that can be served as an evaluation index of the solar radiation amount is used, the solar radiation amount is calculated from a specified solar position, using the cloud's solar radiation transmission coefficient, whereby the solar radiation amount can be evaluated.

In this invention, the solar radiation amount evaluation is performed considering terrain conditions by virtue of separately using the shadow information of a shadow due to terrain and the slope information of the earth's surface; however, when these information are considered in combination, the evaluation accuracy can be further improved. In addition, with regard to the static satellite image data 1 as an evaluation factor in the above description, a plurality of static satellite image data 1 that differ in the photographing time are used, and a plurality of the solar radiation amount evaluation components 6 and the evaluation component after correction are obtained from the plurality of static satellite image data 1. These elements are averaged, whereby the solar radiation amount evaluation component 6 and so on per a predetermined period of time can be calculated, or a change with the lapse of time in the solar radiation amount evaluation component 6 and so on can be grasped.

As seen in the above description, this invention can realize the solar radiation amount evaluation that can realize the accuracy required in the analysis of agricultural crop situations, proper place selection for crops, parameters of precision agriculture, and a heat-island phenomenon.

BRIEF DESCRIPTION OF THE DRAWINGS

FIG. 4A is a view showing a configuration of processing for the calculation of the solar radiation amount and shows a corresponding model of calculation; and FIG. 4B is a view showing the configuration of processing for the calculation of the solar radiation amount and shows a configuration of a pixel value/cloud's solar radiation transmission coefficient table 7.

FIG. 1 shows a general flow of a processing procedure of evaluation of the amount of solar radiation, according to the present invention. FIG. 2 is a block diagram of a computer executing the processing procedure. The computer is configured to include an input part 20 including obtaining means 9, a storage part 22 for storing three-dimensional map data 21, a calculation part 23, and an output part 24 for outputting a calculation result to a monitor (not shown) or the like. The processing of evaluating the solar radiation amount is started by the computer first executing a step of obtaining static satellite image data 1 by the obtaining means 9 (step 1). The static satellite image data 1 is obtained from, for example, Japan Weather Association through an internet or a suitable storage medium. When the static satellite image data 1 is obtained, photographing chronological information and coordinates information including latitude and longitude of a photographing area are simultaneously obtained as annotation data.

The static satellite image data 1 is a set of pixels with density according to a ground resolution, and each pixel comprises a pixel value 5 containing luminance data, etc. The pixel value 5 is reflection data from an object to be photographed, and thus, for example, the pixel value is substantially different between land and sea having substantially different reflectances. Therefore, a part where substantially different pixel values 5 are linearly disposed can be judged as a shoreline, etc.

Figure 2:
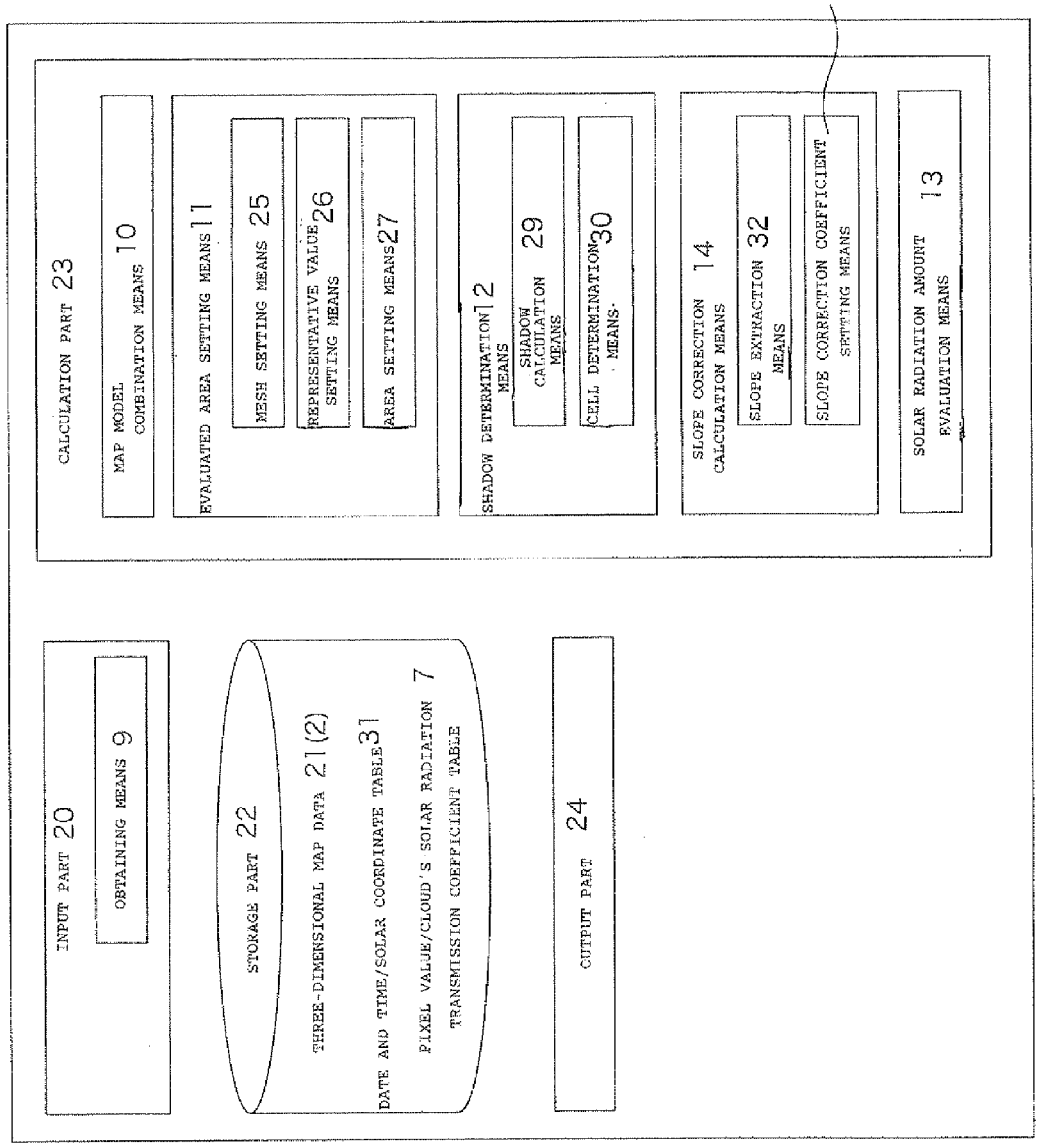
FIG. 2 is a block diagram of a computer according to the present invention.

In order to evaluate the solar radiation amount based on the static satellite image data 1, the calculation part 23, as shown in FIG. 2, is configured to have map model combination means 10, evaluated area setting means 11, shadow determination means 12, slope correction calculation means 14, and solar radiation amount evaluation means 13.

The map model combination means 10 combines the static satellite image data 1 with the three-dimensional map data 21. Namely, the map model combination means 10 applies geometric correction to the static satellite image data 1 to align the static satellite image data 1 with the three-dimensional map data 21 through the coordinate information, and, thus, to combine the static satellite image data 1 with the three-dimensional map data 21. Since the coordinate accuracy of the static satellite image data 1 is low, the alignment is slightly less accurate. Therefore, the map model combination means 10 is provided with a combination point setting part (not shown) which extracts the shoreline and so on as a combination point, whereby in the alignment, error modification is applied by matching the combination points.

The evaluated object area setting means 11 sets an area where the solar radiation amount is evaluated, and is, as shown in FIG. 2, configured to have mesh setting means 25, representative value setting means 26, and area setting means 27. The mesh setting means 25 sets a mesh 3 on the static satellite image data 1, more accurately, synthetic data obtained by combining the static satellite image data 1 with the three-dimensional map data 21, as described above. The mesh 3 is aligned with a ground area corresponding to the ground resolution of the static satellite image data 1, that is, one pixel on the static satellite image data 1. The representative value setting means 26 sets single representative coordinate information to each cell 8, 8, and . . . of the mesh 3. In this embodiment, the center point of each cell 8 is a determination representative point 28, and the coordinate information of the determination representative point 28 is used. The area setting means 27 sets, as an area to be evaluated in the synthetic data, an area that is designated by an input from a mouse or the like (not shown) of the input part 20, or, in other words, only one or a plurality of the cells 8 corresponding to the designated area. When no area to be evaluated is designated from the input part 20, the entire area on the static satellite image data 1 is set as the area to be evaluated, whereby the processing can be proceeded.

The shadow determination means 12 determines a shadow area 4, utilizing a three-dimensional map model 2 of the three-dimensional map data 21 included in the synthetic data, and includes shadow calculation means 29 and cell determination means 30. The solar position for use in the calculation of the shadow area 4 can be specified by the photographing chronological information. The shadow calculation means 29 obtains the solar position from the photographing chronological information with reference to date and time/solar coordinate table 31 provided in the storage part 22 and simulates the solar radiation on the three-dimensional map model 2 to calculate the shadow area 4 in the area to be evaluated. The cell determination means 30 determines whether or not a determination representative point 28 belongs to the shadow area 4 in the area to be evaluated in units of the cell 8. In this embodiment, the center point of the cell 8 is the determination representative point 28, and whether or not the determination representative point 28 belongs to the shadow area 4 is determined.

The slope correction calculation means 14 has slope extraction means 32 and slope correction coefficient setting means 33. The slope extraction means 32 sets, based on the three-dimensional map model 2, the slope information of each cell 8 in the area to be evaluated, that is, a representative slope angle and a representative slope direction of each cell 8. The slope correction coefficient setting means 33 sets a slope correction coefficient for each cell 8. The slope correction coefficient is adopted for use when the solar radiation amount to be received by each cell 8 with the representative slope angle and the representative slope direction is calculated from an assumed solar radiation amount that will be received by each cell 8 when the cells 8 are assumed to be horizontal planes. In this embodiment, the slope extraction means 32 determines the slope information of each cell 8 based on elevation information of peripheral cells 8 including eight cells located around the relevant cell 8 in eight directions including longitudinal, lateral, and diagonal directions. More specifically, for example, an elevation difference between the peripheral cells 8 and a center cell 8 positioned at the center of the peripheral cells is obtained with respect to all the eight directions, and the slope angle and the slope direction of the center cell 8 when the total of the differences in all the eight directions is minimum are determined as the representative slope angle and the representative slope direction. The slope correction coefficient setting means 33 sets the slope correction coefficient for each cell 8. The slope correction coefficient is adopted for use in the conversion from the solar radiation amount when each cell 8 is assumed to be a horizontal plane to the solar radiation amount when the representative slope angle and the representative slope direction are applied. The slope correction coefficient is a function of the slope information with respect to the horizontal plane of the cell 8 and, for example, may be configured to be calculated, sequentially using the solar position specified by the photographing chronological information.

In this embodiment, the solar radiation amount evaluation means 13 is configured to calculate the solar radiation amount itself in the area to be evaluated, and the solar radiation amount in the area to be evaluated is calculated by averaging the solar radiation amounts of the cells 8 in the area to be evaluated. The solar radiation amounts in a plurality of static satellite image data 1, 1, and . . . that differ in the photographing time are averaged, whereby the solar radiation amount in units of a suitable period of time, such as per 1 hour, per 1 day, and per 1 month, is calculated.

The solar radiation amount for each cell 8 is calculated by reflecting an attenuation, due to the shadows described above and gradients, in an estimated solar radiation amount. The estimated solar radiation amount is calculated by the existing solar radiation amount calculation method supposing that an area to be calculated is a horizontal plane, and also, ignoring the generation of a shadow due to terrain. In the calculation of the estimated solar radiation amount, specifically, a cloud's solar radiation transmission coefficient (solar radiation amount evaluation component 6) in each cell 8 is obtained from the pixel value 5 of the static satellite image data 1 corresponding to each cell 8, with reference to a pixel value/cloud's solar radiation transmission coefficient table 7 of the storage part 22, and the solar zenithal angle and so on are led using the solar position. Alternatively, various calculation parameters required for the well-known solar radiation amount calculating formula are suitably obtained by, for example, being read from the storage part 22, and calculation is carried out, whereby the estimated solar radiation amount may be obtained.

The pixel value/cloud's solar radiation transmission coefficient table 7 associates the pixel value 5 with the cloud's solar radiation transmission coefficient 6, the pixel value 5 and the cloud's solar radiation transmission coefficient 6 having some relationship. The table 7 can be configured as shown in FIG. 4B. For example, the past pixel values 5 and the measured solar radiation amounts are stored, and the association is led by a statistical method, whereby the table 7 can be formed. The pixel value 5 corresponding to the cell 8 is generally the pixel value 5 of the relevant cell 8 in the synthetic data; however, with regard to the solar position at which the incident angle of sunlight on the earth's surface is extremely obtuse, the sunlight may pass through a cloud on another cell 8 to enter the earth's surface of the relevant cell 8, and therefore, the cloud's solar radiation transmission coefficient 6 based on the pixel value 5 of another cell 8 corresponding to the incident angle may be used.

After the estimated solar radiation amount has been obtained as described above, when the cell determination means 30 determines that the determination representative point 28 of the cell 8 belongs to the shadow area 4, the solar radiation amount is 0, or a predetermined rate is attenuated, and further the correction calculation using the slope correction coefficient is repeated, whereby the solar radiation amount for each cell 8 (evaluation component after terrain condition correction) is calculated. As described above, the solar radiation amount obtained by averaging the solar radiation amounts of all cells 8 belonging to the area to be evaluated, or by averaging the calculation results from a plurality of the static satellite image data 1 is output from the output part 24 to be displayed on a monitor (not shown). For example, the obtained solar radiation amount can be displayed by overlapping a color, selected according to the solar radiation amount, with the area to be evaluated and thus expressing the solar radiation amount on the map data.

Figure 1:
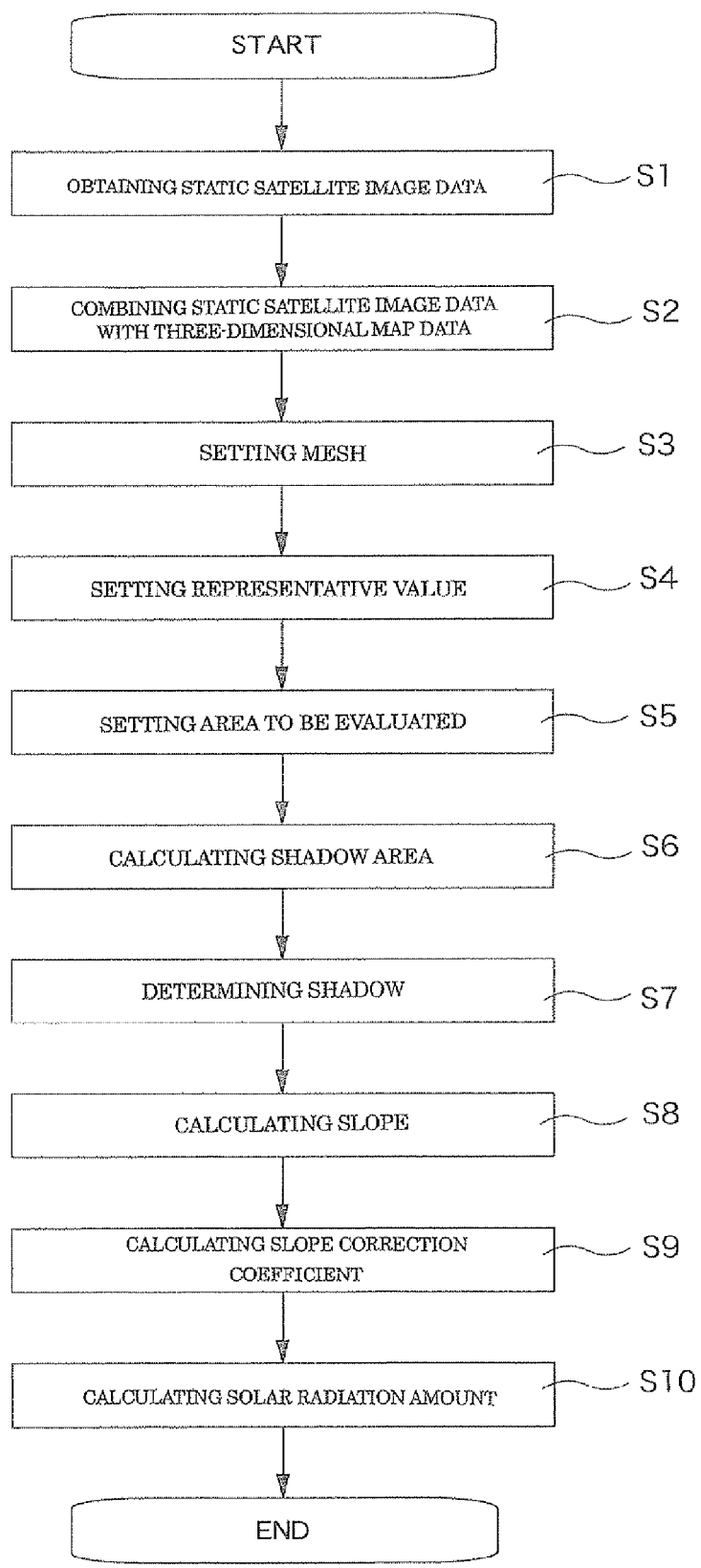
FIG. 1 is a flow chart showing a general processing procedure according to the present invention.

The operation procedure performed by the calculation part 23 of the computer will be described in accordance with FIG. 1. When the static satellite image data 1 and so on are obtained by the obtaining means 9, as described above, the calculation part 23 reads the three-dimensional map data 21 from the storage part 22. Then, the map model combination means 10 of the calculation part 23 combines the static satellite image data 1 with the three-dimensional map data 21 (step S2). The mesh setting means 25 sets the mesh 3 on the obtained combination data in accordance with plane coordinates (step S3). The mesh 3 is previously set in accordance with the ground resolution of the static satellite image data 1, for example.

Subsequently, the representative value setting means 26 refers three-dimensional coordinate information of the determination representative point 28 of each cell 8 of the mesh 3, utilizing the three-dimensional coordinate information included in the three-dimensional map data 21, and sets, to each cell 8, the coordinate information as attributes associated with a coordinate, etc. (step S4). Also, the area setting means 27 sets the area, in which the solar radiation amount will be evaluated, based on partitions of the mesh 3, utilizing the map and the coordinate information included in the three-dimensional map data 21 (step S5).

Thereafter, the shadow calculation means 29 specifies the solar position from the photographing chronological information, obtained by the obtaining means 9, with reference to the date and time/solar coordinate table 31 and calculates the shadow area 4, generated in the area to be evaluated, based on the solar position and the three-dimensional map model 2 that can be constituted of the three-dimensional map data 21 (step S6). After step S6, the cell determination means 30 determines whether or not each cell 8 in the area to be evaluated belongs to the shadow area 4 and sets the determination result as an attribute associated with a shadow of each cell 8 (step S7). Thus, for example, as shown in FIG. 4A, the static satellite image data 1 surface, the three-dimensional map data 21 surface, and the three-dimensional map model 2 based on the three-dimensional map data 21 are mutually aligned, and the mesh 3 is set corresponding to the ground resolution of a pixel, as shown by dotted lines in FIG. 4A. The light from a sun 34 taking positions specified by the photographing chronological information enters the three-dimensional map model 2, and when the shadow areas 4 shown by hatching in FIG. 4A are generated, it is determined that the cells 8 whose determination representative points 28 shown by white circles on the contour of the three-dimensional map model 2 belong to the shadow areas 4 are determined as shadows as shown by the thick lines on the three-dimensional map data 21, and it is determined that the remaining cells 8 are not shadows.

Meanwhile, the slope extraction means 32 extracts the representative slope angle and the representative slope direction of each cell 8 from the elevation value difference between the adjacent cells 8 obtained with reference to the three-dimensional map data 21 (step S8). Thereafter, the slope correction coefficient concerning the pixel value 5 of the static satellite image data 1 and the solar radiation amount is calculated based on, for example, the incident angle of the sunlight entering each cell 8, specified from the extracted slope information and the solar position, and set as an attribute associated with the slope of each cell 8 (step S9).

Figure 3:
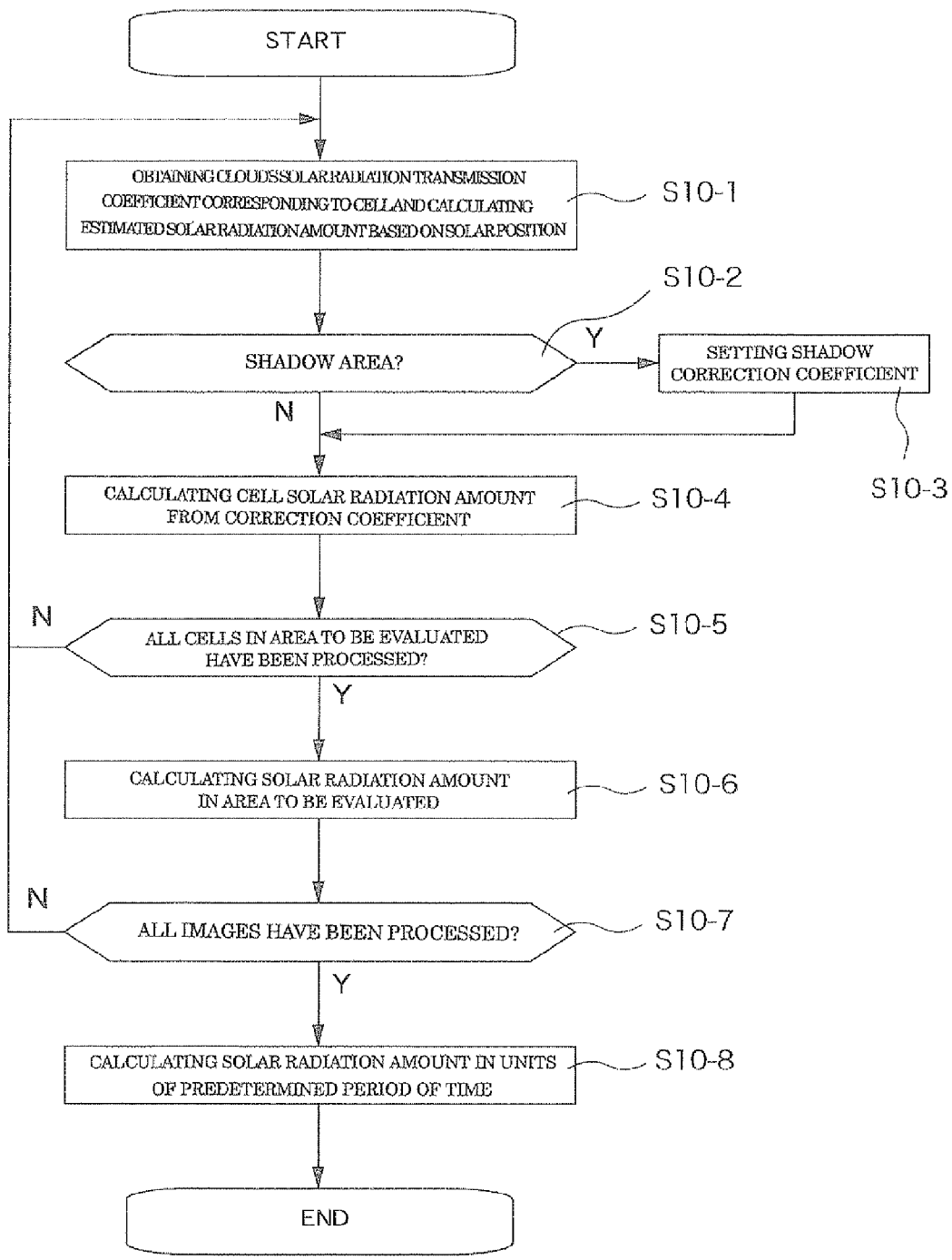
FIG. 3 is a flow chart showing a detailed processing procedure in the calculation step of a solar radiation amount.

Finally, the solar radiation amount evaluation means 13 executes calculation of the solar radiation amount of the area to be evaluated based on the pixel value 5, the coordinate information, the attribute associated with a shadow, the slope correction coefficient of each cell 8, and the solar position (step S10). Specifically, as shown in FIG. 3, the cloud's solar radiation transmission coefficient 6 is first obtained from the pixel value 5 of each cell 8 with reference to the pixel value/cloud's solar radiation transmission coefficient table 7. The estimated solar radiation amount when each cell 8 is not a shadow due to terrain and further when each cell 8 is assumed to be a horizontal plane is calculated from the obtained cloud's solar radiation transmission coefficient 6, the solar position, the coordinate information of each cell 8, and so on (step S10-1). Then, the attribute associated with a shadow of each cell 8 and so on are referred (step S10-2), and with regard to the cell 8 determined as not a shadow, with reference to the slope correction coefficient as it is, the solar radiation amount is calculated from the estimated solar radiation amount, using the slope correction coefficient (step S10-4).

On the contrary, with regard to the cell 8 determined as a shadow, a shadow correction coefficient is set (step S10-3). The shadow correction coefficient is adopted for use in the conversion from the solar radiation amount described above into the solar radiation amount considering a shadow. After step S10-3, the solar radiation amount is calculated from the estimated solar radiation amount using the shadow correction coefficient along with the slope correction coefficient (step S10-4). The solar radiation amount is calculated with respect to all the cells 8, 8, and . . . in the area to be evaluated (step S10-5). When the solar radiation amounts of all the cells 8, 8, and . . . in the area to be evaluated are obtained, they are averaged to calculate the solar radiation amount in the area to be evaluated (step S10-6). In this invention in which the solar radiation amount in a relatively long unit time is obtained using a plurality of the static satellite image data 1 that differ in the photographing time, the calculation of the solar radiation amount in the area to be evaluated is repeated with respect to a plurality of the static satellite image data 1 (step S10-7), and thereafter, the calculated solar radiation amounts in the areas to be evaluated are averaged to obtain the solar radiation amount in a long unit time (Step S10-8).

In the above embodiment, the determination of a shadow 5 and the reflection of the result of the shadow determination for the cell 8 are performed before the calculation of a slope and the reflection of the result of the slope calculation for the cell 8; however, for example, the calculation of a slope may be performed before the determination of a shadow.

DESCRIPTION OF REFERENCE NUMERALS

1. Static satellite image data
2. Three-dimensional map model
3. Mesh
4. Shadow area
5. Pixel value
6. Solar radiation amount evaluation component
7. Table
8. Cell
9. Obtaining means
10. Map model combination means
11. Evaluated area setting means
12. Shadow determination means
13. Solar radiation amount evaluation means
14. Slope correction calculation means

What is claimed is:

1. A method for evaluating a solar radiation amount in an area to be evaluated, comprising:
   using a computer to perform the following steps of:
   obtaining static satellite image data along with photographing chronological data;
   then combining the static satellite image data with a three-dimensional map model;
   then, in accordance with a ground resolution of the static satellite image data, setting a mesh based on plane coordinates to the combination data and, in accordance with the mesh, setting a predetermined area in the combination data as an area to be evaluated;
   thereafter calculating a shadow area, generated in the area to be evaluated, based on the three-dimensional map model and a solar position specified by the photographing chronological data and determining whether or not each cell of the mesh belongs to the shadow area in accordance with a predetermined criterion; and,
   with reference to a table associating a pixel value of each pixel in the static satellite image data with a solar radiation amount evaluation component of an area corresponding to each pixel, obtaining the solar radiation amount evaluation component of each cell in the area to be evaluated, and when the relevant cell is determined to belong to the shadow area, obtaining, instead of the solar radiation amount evaluation component, an evaluation component after terrain condition correction that is calculated by applying a predetermined correction calculation to the solar radiation amount evaluation component.

2. A method for evaluating a solar radiation amount in an area to be evaluated, comprising:
   using a computer to perform the following steps of:
   obtaining static satellite image data along with photographing chronological data;
   then combining the static satellite image data with a three-dimensional map model;
   then, in accordance with a ground resolution of the static satellite image data, setting a mesh based on plane coordinates to the combination data and, in accordance with the mesh, setting a predetermined area in the combination data as an area to be evaluated;
   thereafter, based on the three-dimensional map model, in accordance with a predetermined criterion, obtaining a representative slope angle and a representative slope direction of each cell of the mesh in the area to be evaluated and calculating, for each cell, a slope correction coefficient adopted for use in the conversion from the solar radiation amount evaluation, that is received when each cell is assumed to be a horizontal plane based on a solar position specified by the photographing chronological data, to the solar radiation amount evaluation received when the representative slope angle and the representative slope direction are applied; and
   obtaining a solar radiation amount evaluation component of each cell in the area to be evaluated with reference to a table associating a pixel value of each pixel in the static satellite image data with the solar radiation amount evaluation component for each area when an area corresponding to each pixel is assumed to be a horizontal plane, and thereafter obtaining an evaluation component after terrain condition correction for each cell calculated by applying correction calculation to the solar radiation amount evaluation component with the slope correction coefficient.

3. The method for evaluating a solar radiation amount according to claim 1,
   wherein three-dimensional coordinate data using a center point of a cell as a reference is set to said each cell,
   and wherein whether or not each cell belongs to a shadow area based on the solar position specified by the photographing chronological data is determined by whether or not three-dimensional coordinates of the center point belongs to a shadow area in the three-dimensional map model.

4. The method for evaluating a solar radiation amount according to claim 2,
   wherein three-dimensional coordinate data using a center point of a cell as a reference is set to said each cell,
   and wherein the representative slope angle and the representative slope direction of each cell are calculated based on a difference between elevation data of a center point of a peripheral cell and elevation data of a center point of a central cell.

5. The method for evaluating a solar radiation amount according to claim 1,
   wherein the table comprises a solar radiation transmission coefficient of a cloud set as a solar radiation amount evaluation component,
   and wherein the solar radiation amount is calculated based on a solar position, specified by the photographing chronological data, and the solar radiation transmission coefficient.

6. An apparatus for evaluating a solar radiation amount comprising:
   a processor and a non-transitory medium to perform the following:
   obtaining means that obtains static satellite image data along with photographing chronological data;
   map model combination means that combines the static satellite image data with a three-dimensional map model;
   evaluated area setting means that sets a mesh based on plane coordinates to the combination data in accordance with a ground resolution of the static satellite image data and, in accordance with the mesh, sets a predetermined area in the combination data as an area to be evaluated;

shadow determination means that calculates a shadow area, generated in the area to be evaluated, based on the three-dimensional map model and a solar position specified by the photographing chronological data and determines whether or not each cell of the mesh belongs to the shadow area in accordance with a predetermined criterion; and, solar radiation amount evaluation means that obtains a solar radiation amount evaluation component of each cell in the area to be evaluated with reference to a table associating a pixel value of each pixel in the static satellite image data with the solar radiation amount evaluation component of an area corresponding to each pixel, and, when the relevant cell is determined to belong to the shadow area, obtains, instead of the solar radiation amount evaluation component, an evaluation component after terrain condition correction that is calculated by applying a predetermined correction calculation to the solar radiation amount evaluation component, whereby the solar radiation amount in the area to be evaluated is evaluated.

7. An apparatus for evaluating a solar radiation amount, comprising:

a processor and a non-transitory medium to perform the following:

obtaining means that obtains static satellite image data along with photographing chronological data;

map model combination means that combines the static satellite image data with a three-dimensional map model;

evaluated area setting means that sets a mesh based on plane coordinates to the combination data in accordance with a ground resolution of the static satellite image data and, in accordance with the mesh, sets a predetermined area in the combination data as an area to be evaluated;

slope correction calculation means that, based on the three-dimensional map model, in accordance with a predetermined criterion, obtains a representative slope angle and a representative slope direction of each cell in the mesh in the area to be evaluated and calculates, for each cell, a correction coefficient adopted for use in the conversion from the solar radiation amount evaluation, that is received when each cell is assumed to be a horizontal plane based on a solar position specified by the photographing chronological data, to the solar radiation amount evaluation received when the representative slope angle and the representative slope direction are applied; and solar radiation amount evaluation means that obtains a solar radiation amount evaluation component of each cell in the area to be evaluated with reference to a table associating a pixel value of each pixel in the static satellite image data with the solar radiation amount evaluation component for each area when an area corresponding to each pixel is assumed to be a horizontal plane, and thereafter obtains an evaluation component after terrain condition correction for each cell calculated by applying correction calculation to the solar radiation amount evaluation component with the correction coefficient, whereby the solar radiation amount in the area to be evaluated is evaluated.

8. A method for evaluating a solar radiation amount in an area to be evaluated, comprising:

using a computer to perform the following steps of:

obtaining static satellite image data along with photographing chronological data;

then combining the static satellite image data with a three-dimensional map model;

then, in accordance with a ground resolution of the static satellite image data, setting a mesh based on plane coordinates to the combination data and, in accordance with the mesh, setting a predetermined area in the combination data as an area to be evaluated;

thereafter calculating a shadow area, generated in the area to be evaluated, based on the three-dimensional map model and a solar position specified by the photographing chronological data and determining whether or not each cell of the mesh belongs to the shadow area in accordance with a predetermined criterion;

based on the three-dimensional map model, in accordance with a predetermined criterion, obtaining a representative slope angle and a representative slope direction of each cell of the mesh in the area to be evaluated and calculating, for each cell, a correction coefficient adopted for use in the conversion from the solar radiation amount evaluation, that is received when each cell is assumed to be a horizontal plane based on a solar position, to the solar radiation amount evaluation received when the representative slope angle and the representative slope direction are applied; and obtaining a solar radiation amount evaluation component of each cell in the area to be evaluated with reference to a table associating a pixel value of each pixel in the static satellite image data with the solar radiation amount evaluation component for each area when an area corresponding to each pixel is assumed to be a horizontal plane, and thereafter when the cell is determined to belong to a shadow area, applying a predetermined correction calculation to the solar radiation amount evaluation component, and, obtaining instead of the solar radiation amount evaluation component, an evaluation component after terrain condition correction calculated by additional correction calculation with the correction coefficient.

* * * * *